US008012584B2

(12) United States Patent
Sugiura et al.

(10) Patent No.: US 8,012,584 B2
(45) Date of Patent: Sep. 6, 2011

(54) HIGH-PERFORMANCE PRESSURE VESSEL AND CARBON FIBER FOR PRESSURE VESSEL

(75) Inventors: Naoki Sugiura, Otake (JP); Satoshi Nagatsuka, Toyohashi (JP); Hidehiro Takemoto, Toyohashi (JP); Makoto Matsumoto, Toyohashi (JP); Masayuki Sugiura, Toyohashi (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 1425 days.

(21) Appl. No.: 10/569,366

(22) PCT Filed: Aug. 26, 2004

(86) PCT No.: PCT/JP2004/012709
§ 371 (c)(1),
(2), (4) Date: Feb. 24, 2006

(87) PCT Pub. No.: WO2005/022026
PCT Pub. Date: Mar. 10, 2005

(65) Prior Publication Data

US 2006/0163261 A1 Jul. 27, 2006

(30) Foreign Application Priority Data

Aug. 28, 2003 (JP) ................................ 2003-305228

(51) Int. Cl.
*B32B 9/00* (2006.01)

(52) U.S. Cl. .................... 428/408; 428/36.1; 423/447.1; 423/447.2

(58) Field of Classification Search ................. 428/34.1, 428/35.7, 36.1, 36.9, 36.91, 408; 220/581, 220/586, 588, 589, 592; 423/447.1, 447.2
See application file for complete search history.

(56) References Cited

U.S. PATENT DOCUMENTS

| | | | | |
|---|---|---|---|---|
| 6,190,481 | B1 * | 2/2001 | Iida et al. | 156/175 |
| 2002/0088806 | A1 | 7/2002 | Takaku et al. | |

FOREIGN PATENT DOCUMENTS

| | | |
|---|---|---|
| JP | 01-306619 | 12/1989 |
| JP | 03-113199 | 5/1991 |
| JP | 04-361619 | 12/1992 |
| JP | 6-331032 | 11/1994 |
| JP | 08-285189 | 11/1996 |

(Continued)

OTHER PUBLICATIONS

Notice of Reasons for Rejection issued Aug. 17, 2010, in Japan Patent Application No. 2005-513532 (with English-language translation only).

(Continued)

*Primary Examiner* — Michael C Miggins
(74) *Attorney, Agent, or Firm* — Oblon, Spivak, McClelland, Maier & Neustadt, L.L.P.

(57) ABSTRACT

A pressure vessel includes a vessel body and a fiber reinforced plastic layer formed on the surface of the vessel body, wherein the fiber reinforced plastic layer include fiber reinforced plastic in which reinforcing fibers are impregnated with plastic, a strand elastic modulus of the reinforcing fiber is 305 GPa or higher, and a tensile elongation of the reinforcing fiber is 1.45 to 1.70%. A carbon fiber for a pressure vessel has a strand elastic modulus of 305 GPa or higher and a tensile elongation of 1.45 to 1.70%.

12 Claims, 2 Drawing Sheets

FOREIGN PATENT DOCUMENTS

| | | |
|---|---|---|
| JP | 09-280496 | 10/1997 |
| JP | 10-25627 | 1/1998 |
| JP | 2000-249294 | 9/2000 |
| JP | 2001-181406 | 7/2001 |
| JP | 2002-069754 | 3/2002 |
| JP | 2002-242027 | 8/2002 |
| JP | 2003-172500 | 6/2003 |
| JP | 2003-222299 | 8/2003 |

OTHER PUBLICATIONS

Notice of Reasons for Rejection issued Aug. 17, 2010, in Japan Patent Application No. 2005-513532, filed Sep. 21, 2004 (with English-language translation only).

Office Action issued Mar. 22, 2011, in Japanese Patent Application No. 2005-513532, filed Aug. 26, 2004 (with English translation).

* cited by examiner

HIGH-PERFORMANCE PRESSURE VESSEL AND CARBON FIBER FOR PRESSURE VESSEL

TECHNICAL FIELD

The present invention relates to a pressure vessel used as a storage vessel for high-pressure gas and the like, and to carbon fibers used therein.

This application claims priority from Japanese Patent Application No. 2003-305228 filed Aug. 28, 2003, the content of which is incorporated herein by reference.

BACKGROUND ART

Conventionally, containers made of steel are generally used as storage vessels for high-pressure gas.

However, steel storage vessels are heavy in weight, and much labor for movement, transport and the like is required.

For example, for automobiles using gaseous fuel, lighter-weight fuel storage vessels are required for the purpose of reducing vehicle weight in order to keep the fuel consumption amount low.

As storage vessels for high-pressure gas, instead of the conventional steel storage vessels, pressure vessels made of composite material in which liner material (vessel body) of plastic or metal is strengthened by reinforcing fibers, have come into use. High filling pressure and reduction in weight are realized by pressure vessels having this fiber-reinforced composite material.

In the process for manufacturing the pressure vessels having the fiber-reinforced composite material, there exists the filament winding method (hereinafter, referred to as "FW method") as a representative method for winding the reinforcing fibers.

This method is a method for manufacturing a pressure vessel having fiber-reinforced composite material, which includes winding continuous reinforcing fibers impregnated with plastic onto liner material (a vessel body), and then curing the plastic.

Pressure vessels can be easily manufactured by adopting this FW method. However, in the case in which pressure vessels having, for example, a burst pressure (breakage pressure) of more than 65 MPa are manufactured, the rate of occurrence of the strength of the reinforcing fibers tends to decline. Consequently, it is necessary to thickly wind the reinforcing fibers as a countermeasure thereto, resulting in a problem of increased vessel weight.

Japanese Unexamined Patent Application, First Publication No. H8-285189 discloses a pressure vessel in which carbon fibers having a tensile strength of 5500 MPa or higher. In this pressure vessel, high-strength reinforcing fibers are used in order to obtain a high filling pressure. Japanese Unexamined Patent Application, First Publication No. H9-280496 discloses a vessel in which carbon fibers having an elastic modulus of 200 GPa to 350 GPa and a strength of 4.5 GPa to 10 GPa are used so as to seek higher performance.

Adequate burst pressure is obtained with the aforementioned conventional pressure vessels; however, other problems are engendered as described below.

With regard to the properties required for pressure vessels, not only burst properties are important, but also fatigue properties are important.

Particularly in the case of pressure vessels in which liner material (a vessel body) having metal such as aluminum is used, it is possible to impart compressive stress to the liner material by conducting autofrettage treatment at high pressure. It is possible to improve fatigue properties by conducting the autofrettage treatment so that this compressive stress is within the range of linear characteristics of the liner material. However, in the case in which the pressure vessel is designed with the emphasis on the compressive stress imparted to the liner material, burst pressure is lowered to less than needs. On the other hand, in the case in which the pressure vessel is designed with the emphasis on the burst pressure, the required compressive stress is not imparted. As a result, there is a problem that the used amount of the reinforcing fibers must be increased in order to realize a suitable pressure vessel, resulting in increasing the weight of the vessel and so on.

DISCLOSURE OF INVENTION

The present invention aims to provide a pressure vessel which is superior in both of fatigue properties and burst properties, and that is also lightweight, and to provide reinforcing fibers used in the pressure vessel.

The present invention is a pressure vessel including a vessel body and a fiber reinforced plastic layer formed on the surface of the vessel body, wherein the fiber reinforced plastic layer includes fiber reinforced plastic in which reinforcing fibers are impregnated with plastic, a strand elastic modulus of the reinforcing fibers is 305 GPa or higher, and a tensile elongation of the reinforcing fibers is 1.45 to 1.70%.

According to the aforementioned aspect, a pressure vessel can be realized which is superior in both of fatigue properties and burst properties without being superior in only one vessel property, and which is lightweight.

The strand elastic modulus of the reinforcing fiber may be 305 GPa to 420 GPa.

The vessel body may be made of metal.

Filling pressure may be 30 MPa or higher.

The present invention is also a carbon fiber for a pressure vessel of which a strand elastic modulus is 305 GPa or higher, and a tensile elongation is 1.45 to 1.70%.

According to the aforementioned aspect, it is possible to provide a pressure vessel which is superior in both of fatigue properties and burst properties and which is lightweight, by forming a fiber reinforced plastic layer which includes these fibers impregnated with plastic on the surface of a vessel body.

The strand elastic modulus may be 305 GPa to 420 GPa.

The carbon fiber for a pressure vessel may include a plurality of filaments having an average diameter of 6 μm or less.

The carbon fiber for a pressure vessel may include a plurality of filaments bearing creases on the surface thereof, and difference in height between the highest portion and the lowest portion of the creases may be 40 nm or more.

BEST MODE FOR CARRYING OUT THE INVENTION

Figure 1:
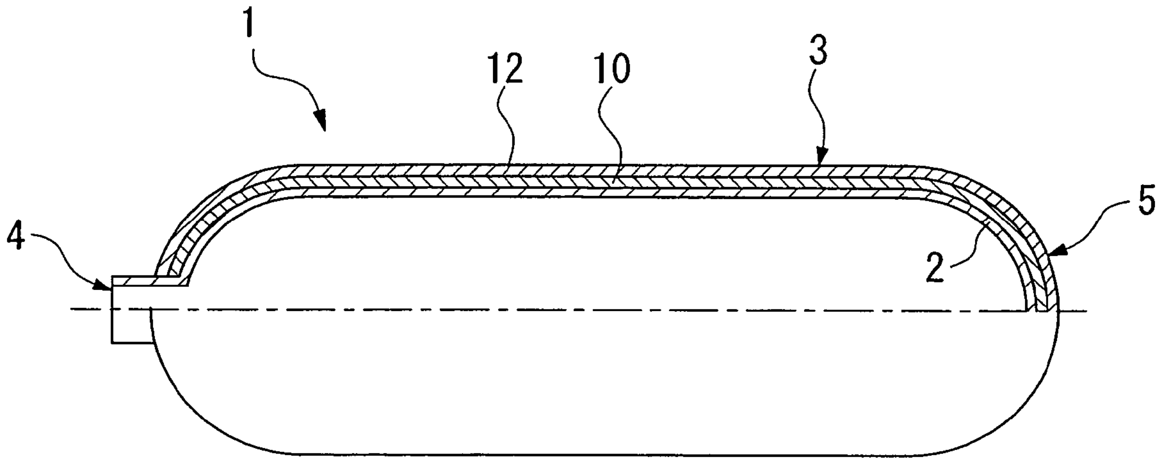
FIG. 1 is a partial sectional view showing an example of one embodiment of the pressure vessel of the present invention.

Suitable embodiments of the present invention are described below with reference to drawings. However, the present embodiment is not limited to the various embodiments that follow, and, for example, the fellow constituent elements of these embodiments may be appropriately combined.

The pressure vessel of the present invention includes a vessel body and a fiber reinforced plastic layer formed on the surface of this vessel body. The fiber reinforced plastic layer includes fiber reinforced plastic in which reinforcing fibers are impregnated with plastic, and specified reinforcing fibers are used as these reinforcing fibers. The specified reinforcing fiber is a fiber of which a strand elastic modulus is 305 GPa or higher and of which a tensile elongation is 1.45 to 1.70%.

In the case in which the strand elastic modulus of the reinforcing fiber is less than 305 GPa, it is necessary to increase the winding amount of the reinforcing fibers in order to obtain sufficient rigidity, which results in a vessel of which wall thickness is thick. As a results, vessel weight is increased.

In the case in which the tensile elongation of the reinforcing fiber is less than 1.45%, the winding amount of the reinforcing fiber must be increased, because the reinforcing fiber lacks sufficient strength. This inevitably leads to thickened walls, resulting in a vessel which has excessive fatigue properties and is heavy in weight. On the other hand, in the case in which the tensile elongation of the reinforcing fiber is more than 1.70%, the strength of the reinforcing fiber is sufficient; however, the reinforcing fiber does not have sufficient elastic modulus commensurate with this strength. Accordingly, in the fiber reinforced plastic layer, rigidity is excessively high compared with the other properties, resulting in a vessel that has excessive burst properties.

The upper limit of the strand elastic modulus of the reinforcing fiber is preferably 420 GPa or less. When using reinforcing fiber of which the strand elastic modulus is more than 420 GPa, sufficient rigidity is obtained even if the amount of composite material wound onto the vessel body is reduced. Therefore, a lightweight pressure vessel can be obtained. However, there is the problem that the obtained pressure vessel having thin wall thickness, is inferior in shock performance and fire exposure performance. Furthermore, surface adhesiveness with the plastic (matrix plastic) with which the reinforcing fibers are impregnated, is insufficient; thereby, the performance (pressure resistance) of the pressure vessel declines.

Balancing these properties and performances of the reinforcing fiber is particularly important for high-pressure vessels using metal liners and for high-pressure vessels of which filling pressure is 30 MPa or higher. This is because, in high-pressure vessels in which metal liners are used and of which filling pressure is 30 MPa or higher, balancing of the fatigue properties and the burst properties tends to deteriorate, that is, excessive performance by one or the other tends to occur; as a results, the thickness of the fiber reinforced plastic layer must be increased in order to satisfy the other set of properties, and the weight of the pressure vessel increases.

Accordingly, in consideration of the balancing of the elastic modulus and the strength of the reinforcing fiber, reinforcing fibers having sufficient strength and elastic modulus commensurate with that strength, are used in the present invention. By forming a fiber reinforced plastic layer having this type of reinforcing fibers on the vessel body, it is possible to offer a pressure vessel with little waste, in which the properties and performances of the pressure vessel such as burst properties and fatigue properties are well balanced and satisfactory, the used amount of the reinforcing fibers is minimized, and weight increase due to the conventional formation of thick walls, is inhibited.

This type of reinforcing fiber for pressure vessels is a fiber having a strand elastic modulus of 305 GPa or higher and a tensile elongation of 1.45% to 1.70%, and examples thereof may include carbon fibers, boron fibers and the like, having these properties. Among these, carbon fibers are very suitable. The strand elastic modulus is preferably 310 GPa or higher, and is more preferably 320 GPa or higher. The tensile elongation is preferably 1.50% to 1.70%, and is more preferably 1.55% to 1.70%.

Furthermore, carbon fibers having a strand elastic modulus of 420 GPa or less, are more preferable. In particular, for manufacturing the carbon fibers having a strand elastic modulus of more than 420 GPa, a carbonizing temperature of more than 2000° C. is required. As a result, a compressive strength, a shear strength and the like tend to decrease, and anisotropy of the composite material increases; thereby, the mechanical properties of the pressure vessel tend to decline. Furthermore, since the carbon fibers are hard to handle, problems tend to occur in which workability in the process of filament winding or the like deteriorates.

The upper limit of the strand elastic modulus is preferably 400 GPa, and is more preferably 380 GPa.

Furthermore, filaments included in the carbon fiber are preferably filaments of which an average diameter is 6 μm or less. As the average diameter of the precursor fiber decreases, the elastic modulus is more readily manifested. As a result, when manufacturing carbon fiber tows having a predetermined elastic modulus, it is possible to apply a lower carbonizing temperature. In the case in which the carbonizing temperature is low, it is possible to manufacture carbon fiber tows which realize high strand strength, which further exhibit high shear strength and high compressive strength, and which have excellent mechanical properties. Accordingly, carbon fibers having a small fiber diameter are more preferable, particularly an average diameter of the carbon fibers is preferably 6 μm or less, and is more preferably 5.5 μm or less. There are no particular limits on the lower limit of diameter; however, since spinnability of the precursor fibers deteriorates as the fiber diameter decreases, 3 μm or more is preferable.

Ordinarily, 1,000 to 50,000 filaments having an average diameter of 5 to 8 μm are brought together to constitute a carbon fiber.

Each filament included in the carbon fiber preferably bears a plurality of creases on the surface thereof, which have difference in height between the highest portion and the lowest portion thereof is 40 nm or more. By means of these surface creases, the wettability of the carbon fiber and the matrix plastic is improved, and the adhesion of the surface becomes firmer. As a result, it is possible to stably obtain pressure vessels having excellent mechanical properties, and to manufacture pressure vessels with stable quality.

Furthermore, the difference in height between the highest portion and the lowest portion of the creases is more preferably 10% or less of the diameter of the filament.

The depth of the creases existing on the surfaces of the filaments of the carbon fiber is defined as the difference in height between the highest portion and the lowest portion in a region measuring 2 μm in the circumferential direction by 1 μm in the fiber axis direction. The creases on the surface of the filament are in a shape of peak-valley form having a length of 1 μm or more in a certain direction. There are no particular restrictions on the direction, and it may be parallel or perpendicular to the fiber axis direction, or be angled relative to the fiber axis direction. On a surface of an ordinary carbon fiber obtained by the common method for manufacturing carbon fiber tows, the creases are approximately parallel to the fiber axis direction.

The height differences in the creases may be measured as follows, based on the results of observation of the surface configuration of the filament measured using a scanning atomic force microscope (AFM).

Several filaments of a carbon fiber tow are placed on a specimen stand, both ends thereof are fixed, and Dotite is coated around them so as to prepare measurement samples. As the AFM, an atomic force microscope (manufactured by Seiko Instruments KK, SPI3700/SPA-300 (brand name)) is used which is provided with a cantilever made of silicon nitride and having a probe formed at the tip. The probe is scanned in a scanning length of 1 μm in the fiber axis direction of the filament in the AFM mode, and this scanning of the probe is repeatedly conducted over a scanning field measuring 2 to 2.5 μm in the circumferential direction of the filament while shifting the probe in the circumferential direction little by little. By this means, the surface configuration is measured in a field measuring 2 to 2.5 μm in the circumferential direction of the filament surface and 1 μm in the fiber axis direction. The obtained measurement image is subjected to inverse transformation after removing the low-frequency components by two-dimensional Fourier transformation. From a planar image of the cross-section from which the curvature of the filament has been removed in this manner, the difference in height between the highest portion and the lowest portion is measured in the region measuring 2 μm in the circumferential direction by 1 μm in the fiber axis direction.

FIG. 1 is a partial sectional view showing an example of one embodiment of the pressure vessel of the present invention.

In the pressure vessel 1 shown in FIG. 1, fiber reinforced plastic layers 10 and 12 having the aforementioned fiber reinforced plastic are provided on an approximately cylindrical vessel body 2. In this example, the fiber reinforced plastic layers 10 and 12 are formed so as to cover the entire area excluding an aperture 4 of the vessel body 2, that is, a cylindrical section 3 and a bottom portion 5.

There are no particular restrictions on the vessel body 2 as long as it is formed from material that prevents leakage of the gas filled therein; however, a vessel body 2 formed from plastic or metal is preferable. Examples of plastic include high-density polyethylene. Examples of metal include aluminum alloy, magnesium alloy, iron and the like. In particular, aluminum alloy is well suited to weight saving for the vessel body 2.

With regard to the fiber reinforced plastic layers, a single layer is acceptable; however, a multi-layer structure as in this embodiment is preferable.

In this embodiment, a two-layer configuration is adopted in which the fiber reinforced plastic layer (axially oriented layer) 12 formed by winding fiber reinforced plastic so that the orientation direction of the fibers is the major-axis direction of the vessel body 2 is on the fiber reinforced plastic layer (circumferentially oriented layer) 10 formed by winding fiber reinforced plastic so that the orientation direction of the fibers is the circumferential direction of the vessel body 2.

In the present invention, the fiber reinforced plastic layers are not limited to the illustrated configuration, and a multi-layer structure of three layers or more that alternately laminates a circumferentially oriented layer and an axially oriented layer on the vessel body, may be adopted.

In particular, it is preferable that the outermost layer of the fiber reinforced plastic layers be the circumferentially oriented layer; thereby, a satisfactory external appearance is obtained. The number of layers and their thicknesses may be set regarding applications of the vessel, type of contents, size, and the like.

As to the plastic (matrix plastic) with which the reinforcing fibers are impregnated, there are no particular restrictions as long as it may be generally used for fiber reinforced plastic layers. Examples of the plastic includes epoxy resin, vinyl ester resin, phenol resin, acrylic resin and the like.

One example of the method for manufacturing the aforementioned pressure vessel 1 is described below.

(1) Formation of Fiber Reinforced Plastic Layer

Figure 2A:
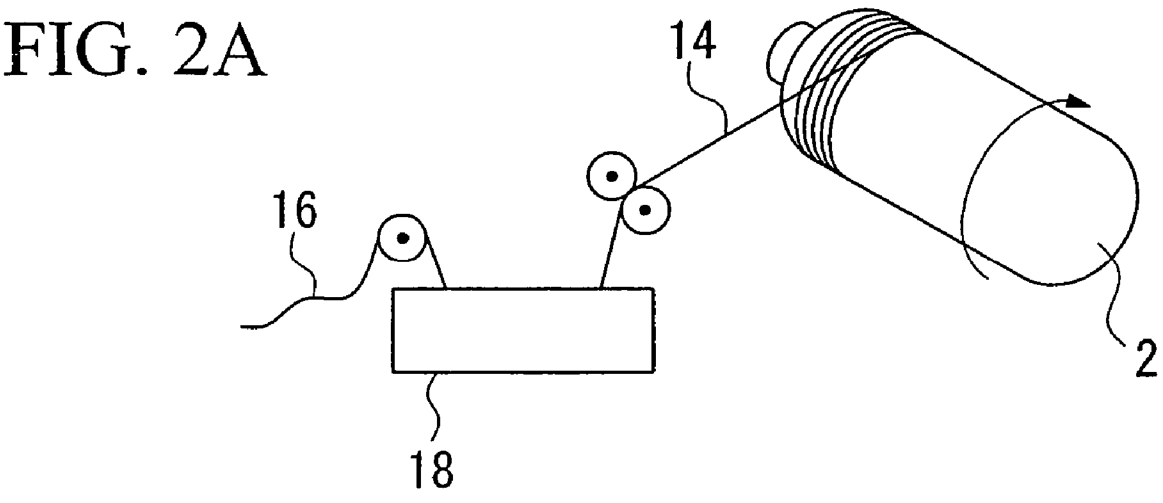
FIG. 2A is a typical view showing the process of forming fiber reinforced plastic layers in the method for manufacturing a pressure vessel.

As shown in FIG. 2A, reinforcing fibers 16 are impregnated with matrix plastic stored in a storage tank 18 so as to obtain fiber reinforced plastic 14.

Subsequently, while rotating the vessel body 2 in the circumferential direction, the fiber reinforced plastic 14 is wound onto the vessel body 2. By this means, a circumferentially oriented layer 10 is formed in which the fiber orientation direction of the fiber reinforced plastic layer 14 is the circumferential direction of the vessel body 2.

Next, an axially oriented layer 12 is formed. When forming the axially oriented layer 12, the fiber orientation direction of the fiber reinforced plastic layer 14 is set to the major-axis direction of the vessel body 2. By this means, an intermediate vessel 20 having fiber reinforced plastic layers of multi-layer structure in which the circumferentially oriented layer 10 and the axially oriented layer 12 is alternately laminated, is obtained.

Here, the above-described method may be repeated in order to form additional layers on the axially oriented layer 12.

(2) Resin Layer Curing

Figure 2B:
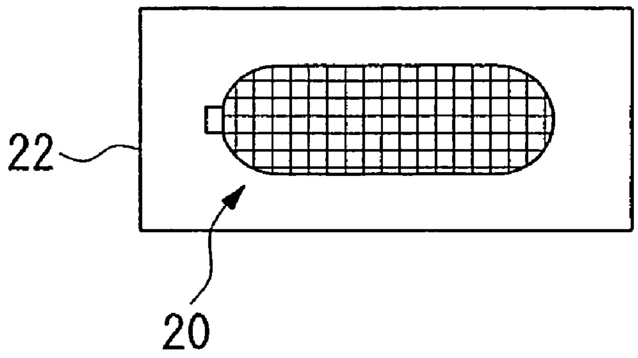
FIG. 2B is a typical view showing the process of curing the plastic in the method for manufacturing a pressure vessel.

Next, as shown in FIG. 2B, the intermediate vessel 20 is heated in a furnace 22 so as to cure the fiber reinforced plastic layers.

The heating temperature is preferably 40 to 180° C. In the case in which the heating temperature is lower than or higher than the aforementioned range, the fatigue properties and burst properties of the obtained pressure vessel 1 deteriorate.

(3) Autofrettage Treatment

Figure 2C:
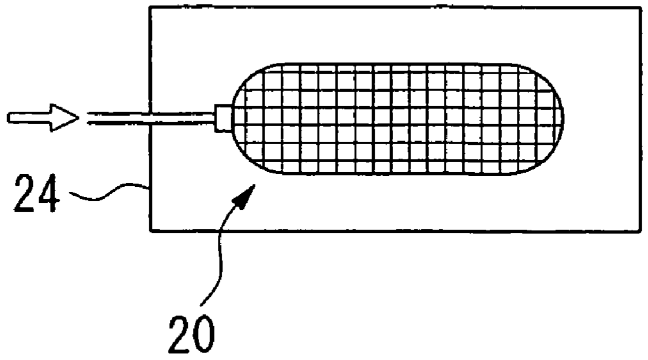
FIG. 2C is a typical view showing the process of autofrettage treatment in the method for manufacturing a pressure vessel.

Subsequently, as shown in FIG. 2C, autofrettage treatment is conducted using an autofrettage treatment device 24 so that the compressive stress in the circumferential direction of the vessel surface after autofrettage is 95% of the vessel yield stress. Here, the autofrettage treatment includes raising an internal pressure of the intermediate vessel 20 (the maximum value of the internal pressure of the vessel at this time is referred to as the autofrettage treatment pressure) so as to permanently deform the liner material (the vessel body 2), and then reducing the internal pressure of the vessel so as to impart compressive stress to the vessel body 2 by the rigidity of the fiber reinforced plastic layers 10 and 12.

In this manner, the pressure vessel is manufactured.

EMBODIMENTS

The pressure vessel of the present invention is described below by means of specific embodiments.

The evaluation techniques for the reinforcing fibers are as follows.

(Strand Strength, Elastic Modulus, Tensile Elongation)

These were evaluated in conformity with JIS R7601.

Strand strength was divided by strand elastic modulus so as to calculate tensile elongation.

(Average Diameter of Filament Cross-Section of Carbon Fiber Tow)

First, using the yield, density and number of filaments (filament quantity) of the fiber tow, the average cross-sectional area of a filament cross-section of a carbon fiber tow was calculated from the following Formula (1).

The yield of the fiber tow is the mass per unit length of the carbon fiber tow (fineness), and was measured in conformity with JIS R7601.

The density of the fiber tow was measured by the density gradient tube method in conformity with JIS R7601.

$$A_{av} = \frac{1}{n} \times \frac{t}{\rho} \times 10^{-3} \qquad \text{Formula (1)}$$

$A_{av}$: average cross-sectional area of filament n: number of filaments composing tow t: yield (Tex)

ρ: density (g/cm$^3$)

From the obtained average cross-sectional area of the filament, the average diameter was calculated on the assumption that the cross-sectional form is completely round.

(Depth of Creases on Filament Surfaces of Carbon Fiber Tow)

The depth of the creases existing on filament surfaces of carbon fiber tow was defined as the difference in height between the highest portion and lowest portion in a region measuring 2 μm in the circumferential direction by 1 μm in the fiber axis direction. The difference in height was measured based on the measurement results for surface configuration obtained by scanning the probe on the surface of the filament using a scanning atomic force microscope (AFM). Specifically, the measurement was done as follows.

Several filaments of a carbon fiber tow were placed on a specimen stand, both ends thereof were fixed, and Dotite was applied around them so as to prepare measurement samples. As the AFM, an atomic force microscope (manufactured by Seiko Instruments KK, SPI3700/SPA-300 (brand name)) was used which was provided with a cantilever made of silicon nitride and having a probe formed at the tip. The probe was scanned in a scanning length of 1 μm in the fiber axis direction of the filament in the AFM mode, and this scanning of the probe was repeatedly conducted over a scanning field measuring 2 to 2.5 μm in the circumferential direction of the filament while shifting the probe in the circumferential direction little by little. By this means, the surface configuration was measured in a field measuring 2 to 2.5 μm in the circumferential direction of the filament surface and 1 μm in the fiber axis direction. The obtained measurement image was subjected to inverse transformation after removing the low-frequency components by two-dimensional Fourier transformation. From a planar image of the cross-section from which the curvature of the filament has been removed in this manner, the difference in height between the highest portion and the lowest portion was measured in the region measuring 2 μm in the circumferential direction by 1 μm in the fiber axis direction.

(1) Reinforcing Fiber

The reinforcing fibers (i) to (viii) shown below were prepared.

Reinforcing fibers (i): Filament diameter was approximately 5 μm, number of filaments was 24,000, strand strength was 5250 MPa, strand elastic modulus was 350 GPa, and elongation was 1.50%. The crease depth was 80 nm.

Reinforcing fibers (ii): Filament diameter was approximately 5 μm, number of filaments was 24,000, strand strength was 4960 MPa, strand elastic modulus was 320 GPa, and elongation was 1.55%. The crease depth was 80 nm.

Reinforcing fibers (iii): Carbon fibers MR35E-12K manufactured by Mitsubishi Rayon Co., Ltd. were used. These carbon fibers had a filament diameter of 7 μm, number of filaments of 12,000, strand strength of 4410 MPa, strand elastic modulus of 295 GPa, and elongation of 1.49%. The crease depth was 100 nm.

Reinforcing fibers (iv): Carbon fibers HR40-12K manufactured by Mitsubishi Rayon Co., Ltd. were used. These carbon fibers had a filament diameter of 6 μm, number of filaments of 12,000, strand strength of 4610 MPa, strand elastic modulus of 390 GPa, and elongation of 1.18%. The crease depth was 20 nm.

Reinforcing fibers (v): Carbon fibers MR60H-24K manufactured by Mitsubishi Rayon Co., Ltd. were used. These carbon fibers had a filament diameter of approximately 5 μm, number of filaments of 24,000, strand strength of 5800 MPa, strand elastic modulus of 290 GPa, and elongation of 2.00%. The crease depth was 80 nm.

Reinforcing fibers (vi): Filament diameter was approximately 5 μm, number of filaments was 24,000, strand strength was 5220 MPa, strand elastic modulus was 360 GPa, and elongation was 1.45%. The crease depth was 80 nm.

Reinforcing fibers (vii): These carbon fibers had a filament diameter of approximately 5 μm, number of filaments of 24,000, strand strength of 5250 MPa, strand elastic modulus of 320 GPa, and elongation of 1.64%. The crease depth was 80 nm.

Reinforcing fiber (viii): Filament diameter was approximately 5 μm, number of filaments was 24,000, strand strength was 5270 MPa, strand elastic modulus was 310 GPa, and elongation was 1.70%. The crease depth was 80 nm.

Now, reinforcing fiber (i), reinforcing fibers (ii), reinforcing fibers (vi), reinforcing fibers (vii) and reinforcing fibers (viii) were manufactured as follows.

Spinning solution was prepared by dissolving acrylonitrile polymer in dimethylacetoamide, and carbon-fiber-precursor fiber tows were obtained by subjecting this spinning solution to wet spinning in the manner shown below. First, the spinning solution was discharged into a first coagulation bath including a dimethylacetoamide aqueous solution with a concentration of 50 to 70 mass % and a temperature of 30 to 50° C.; thereby, coagulated yarns were prepared. Next, the coagulated yarns were subjected to drawing by a specified force in a second coagulation bath including a dimethylacetoamide aqueous solution with a concentration of 50 to 70 mass % and a temperature of 30 to 50° C., wet heat drawing was further conducted so that the length was 3.5 times or more longer than before the drawing. Thereby, the carbon-fiber-precursor fiber tows were obtained.

The cross-sectional average diameter and the crease depth were adjusted by changing the concentration and the temperature of the coagulation bath and the drawing conditions. In order to maintain stability in the spinning process, a silicon oil solution was deposited.

Next, a plurality of carbon-fiber-precursor fiber tows arranged in parallel were put into a flameproofing furnace, and oxidizing gas such as air which was heated to 200 to 300° C., was blown to the carbon-fiber-precursor fiber tows under conditions of an extension rate of −2.0% or more (conditions by which fiber tows were contracted at a contraction rate of 2.0% or more). Thereby, the carbon-fiber-precursor fiber tows were flameproofed so as to obtain flameproofed fiber tows. Next, these flameproofed fiber tows were put into a carbonizing furnace, and were carbonized in an inert gas atmosphere at a temperature of 1300 to 2000° C. under conditions of a high extension rate of −5.0% or more so as to obtain the carbon fiber tows. Here, the carbonizing temperatures for manufacturing the reinforcing fiber (i), reinforcing fiber (ii), reinforcing fiber (vi), reinforcing fiber (vii) and reinforcing fiber (viii) were respectively 1800° C., 1550° C., 1950° C., 1600° C. and 1550° C.

In order to improve compatibility with plastic, these carbon fiber tows were subjected to wet electrolytic oxidation treatment so as to introduce functional groups containing oxygen onto the surfaces of the carbon fiber tows. Furthermore, 1.0 mass % of epoxy sizing agent having the composition shown in Table 1 was applied to the carbon fiber tows, and then the carbon fiber tows were wound onto bobbins.

TABLE 1

| | Compound | Composition | Manufacturing company |
|---|---|---|---|
| Base | Epikote 828 | 50 | Japan Epoxy Resin Co., Ltd. |
| compound | Epikote 1001 | 30 | Japan Epoxy Resin Co., Ltd. |
| Emulsifier | Pluronic F88 | 20 | Asahi Denka Co., Ltd. |

(2) Matrix Plastic

Epoxy resin "#700B" manufactured by Mitsubishi Rayon Co., Ltd. (composition Ep828/XN1045/BYK-A506) was used.

(3) Vessel Body

An aluminum vessel body having a capacity of 9 liters (total length: 540 mm, length of cylindrical section: 415 mm, outer diameter of cylindrical section: 163 mm, wall thickness at center of cylindrical section: 3 mm) was used.

First Embodiment

A pressure vessel having a normal filling pressure of 70 MPa was prepared by the following procedure.

As shown in FIG. 2A, the reinforcing fibers (i) (elongation: 1.50%, elastic modulus: 350 GPa) were impregnated with matrix plastic so as to obtain the fiber reinforced plastic 14. Using a filament winding machine manufactured by Entec Composite Machines, Inc., the fiber reinforced plastic 14 was wound onto the vessel body 2, and fiber reinforced plastic layers of 5-layer structure were formed.

The fiber reinforced plastic layers had a five-layer structure of circumferentially oriented layer (C)/axially oriented layer (H)/circumferentially oriented layer (C)/axially oriented layer (H)/circumferentially oriented layer (C) in the order in which they were arranged from the inside (vessel body side) toward the outside (outer side).

In the obtained intermediate vessel 20, measurement result of the thickness of the fiber reinforced plastic layers at the center of the cylindrical section was approximately 13 mm.

Next, as shown in FIG. 2B, the intermediate vessel 20 was put into a heating furnace 22, and the internal furnace temperature was raised from room temperature to 135° C. at 1° C./minute.

After confirming that the surface temperature of the fiber reinforced plastic layers had reached 135° C., they were left at that temperature for 1 hour.

Subsequently, the internal furnace temperature was reduced to 60° C. at 1° C./minute, and then the intermediate vessel 20 was removed from the heating furnace 22, and the intermediate vessel 20 was cooled to room temperature. The mass of the fiber reinforced plastic layers was 5,612 g.

As shown in FIG. 2C, the intermediate vessel 20 was subjected to autofrettage treatment at an autofrettage treatment pressure of 158 MPa using an autofrettage treatment device 24; thereby, compressive stress was applied to the vessel body 2 so as to obtain the pressure vessel 1.

Burst properties, fatigue properties and lightweightness of the obtained pressure vessel were evaluated.

(1) Breakage Pressure Test (Burst Properties)

The pressure vessel was set in a hydraulic burst tester (manufactured by Mitsubishi Rayon Co., Ltd.), hydraulic pressure was applied to the pressure vessel at a pressure boosting rate of 1.4 MPa/sec or less, and pressure was measured at the time when the pressure vessel broke.

As the vessel performance generally required for a filled vessel having a normal filling pressure of 70 MPa, the standards prescribe that burst pressure (breakage pressure) be 164.5 MPa or higher, and considering safety, burst pressure (breakage pressure) was required to be 175 MPa or higher.

(2) Fatigue Properties Test

The pressure vessel was set in a hydraulic cycle tester (manufactured by Mitsubishi Rayon Co., Ltd.). The internal pressure of the pressure vessel was raised from atmospheric pressure to a pressure that was 5/3 times as high as the normal filling pressure, and then the internal pressure was reduced to atmospheric pressure. Such pressure fluctuation operations was repeated at a frequency of approximately twice per minute until the pressure vessel was burst, and the number of cycles of the pressure fluctuation operations until bursting was measured.

As the vessel performance generally required for a filled vessel having a normal filling pressure of 70 MPa, the standards prescribe that the number of cycles until bursting in the fatigue properties testing be 11,250 or more, and considering safety, the number of cycles until bursting in the fatigue properties was required to be 12,500 or more.

(3) Lightweightness

The mass of the fiber reinforced plastic layers of each pressure vessel was measured.

The burst pressure (BP) of the obtained pressure vessel 1 was 211 MPa. This value was equivalent to that of approximately 3 times as high as the normal filling pressure (FP). The bursting state at that time in each case was an ideal bursting mode in which only a hole was opened at or in the vicinity of the center of the cylindrical section without splitting of the pressure vessel.

As a result of the fatigue properties testing, the number of cycles of the pressure fluctuation operations until bursting for the pressure vessel 1 was 16,190. The burst position at that time was observed in a liner portion in the cylindrical section of the pressure vessel.

The pressure vessel 1 of the first embodiment exhibited excellent results in burst properties and fatigue properties, which showed that the pressure vessel had the potential for further weight reduction.

Second Embodiment

A pressure vessel having a normal filling pressure (FP) of 70 MPa was prepared by the following procedure.

In the similar way as that in the first embodiment, fiber reinforced plastic layers having the fiber reinforced plastic 14 in which the reinforcing fibers (ii) (elongation: 1.64%, elastic modulus: 320 GPa) were impregnated with matrix plastic, were formed on the vessel body 2 so as to obtain the intermediate vessel 20.

The fiber reinforced plastic layers had the same 5-layer structure as that of the first embodiment. In the intermediate vessel 20, measurement result of the thickness of the fiber reinforced plastic layers at the center of the cylindrical section was approximately 13 mm.

The intermediate vessel 20 was subjected to heat treatment in the same way as that in the first embodiment. The mass of the fiber reinforced plastic layers was 5,633 g.

Next, the intermediate vessel 20 was subjected to autofrettage treatment in the same way as that in the first embodiment so as to obtain the pressure vessel. The autofrettage treatment pressure was 140 MPa.

Evaluation was conducted in the same way as that in the first embodiment.

The burst pressure (BP) of the pressure vessel was 198 MPa. This value was equivalent to that of approximately 2.8 times as high as the normal filling pressure (FP). The bursting state at that time in each case was an ideal bursting mode in which only a hole was opened at or in the vicinity of the center of the cylindrical section without splitting of the pressure vessel.

As a result of the fatigue properties testing, the number of cycles of the pressure fluctuation operations until bursting for the pressure vessel was 13,308. The burst position at that time was observed in the liner portion of the cylindrical section of the pressure vessel.

This pressure vessel was an example in which reinforcing fibers having a low elastic modulus and ideal elongation was used. Compared with the properties of pressure vessels of this class that were generally known, and even compared with the standards to which the safety factor was applied, adequate performance was exhibited in terms of burst properties and fatigue properties. There also remained scope, albeit slight, for weight reduction.

Third Embodiment

A pressure vessel having a normal filling pressure (FP) of 70 MPa was prepared by the following procedure.

In the similar way as that in the first embodiment, fiber reinforced plastic layers having the fiber reinforced plastic 14 in which the reinforcing fibers (vi) (elongation: 1.45%, strand elastic modulus: 360 GPa) were impregnated with matrix plastic, were formed on the vessel body 2 so as to obtain the intermediate vessel 20.

The fiber reinforced plastic layers had the same 5-layer structure as that of the first embodiment. In the intermediate vessel 20, measurement result of the thickness of the fiber reinforced plastic layers at the center of the cylindrical section was approximately 13 mm.

The intermediate vessel 20 was subjected to heat treatment in the same way as that in the first embodiment. The mass of the fiber reinforced plastic layers was 5,580 g.

Next, the intermediate vessel 20 was subjected to autofrettage treatment in the same way as that in the first embodiment so as to obtain the pressure vessel. The autofrettage treatment pressure was 140 MPa.

The burst pressure (BP) of the obtained pressure vessel 1 was 208 MPa. This value was equivalent to that of approximately 3 times as high as the normal filling pressure (FP). The bursting state at that time in each case was an ideal bursting mode in which only a hole was opened at or in the vicinity of the center of the cylindrical section without splitting of the pressure vessel.

As a result of the fatigue properties testing, the number of cycles of the pressure fluctuation operations until bursting for the pressure vessel 1 was 18,310. The burst position at that time was observed in the liner portion of the cylindrical section of the pressure vessel.

The pressure vessel 1 of the third embodiment exhibited excellent results in burst properties and fatigue properties, which showed that the pressure vessel had the potential for further weight reduction.

Fourth Embodiment

A pressure vessel having a normal filling pressure (FP) of 70 MPa was prepared by the following procedure.

In the similar way as that in the first embodiment, fiber reinforced plastic layers having the fiber reinforced plastic 14 in which the reinforcing fibers (vii) (elongation: 1.64%, elastic modulus: 320 GPa) were impregnated with matrix plastic, were formed on the vessel body 2 so as to obtain the intermediate vessel 20.

The fiber reinforced plastic layers had the same 5-layer structure as that of the first embodiment. In the intermediate vessel 20, measurement result of the thickness of the fiber reinforced plastic layers at the center of the cylindrical section was approximately 13 mm.

The intermediate vessel 20 was subjected to heat treatment in the same way as that in the first embodiment. The mass of the fiber reinforced plastic layers was 5,633 g.

Next, the intermediate vessel 20 was subjected to autofrettage treatment in the same way as that in the first embodiment so as to obtain the pressure vessel. The autofrettage treatment pressure was 140 MPa.

Evaluation was conducted in the same way as that in the first embodiment.

The burst pressure (BP) of the pressure vessel was 206 MPa. This value was equivalent to that of approximately 2.9 times as high as the normal filling pressure (FP). The bursting state at that time in each case was an ideal bursting mode in which only a hole was opened at or in the vicinity of the center of the cylindrical section without splitting of the pressure vessel.

As a result of the fatigue properties testing, the number of cycles of the pressure fluctuation operations until bursting for the pressure vessel was 13,500. The burst position at that time was observed in the liner portion of the cylindrical section of the pressure vessel.

This pressure vessel was an example in which reinforcing fiber having a low elastic modulus and ideal elongation was used. Compared with the properties of pressure vessels of this class that were generally known, and even compared with the standards to which the safety factor was applied, adequate performance was exhibited in terms of burst properties and fatigue properties. There also remained scope, albeit slight, for weight reduction.

Fifth Embodiment

A pressure vessel having a normal filling pressure of 70 MPa was prepared by the following procedure.

In the similar way as that in the first embodiment, fiber reinforced plastic layers having the fiber reinforced plastic 14 in which the reinforcing fibers (viii) (elongation: 1.70%, elastic modulus: 310 GPa) were impregnated with matrix plastic, were formed on the vessel body 2 so as to obtain the intermediate vessel 20.

The fiber reinforced plastic layers had the same 5-layer structure as that of the first embodiment. In the intermediate vessel 20, measurement result of the thickness of the fiber reinforced plastic layers at the center of the cylindrical section was approximately 13 mm.

The intermediate vessel 20 was subjected to heat treatment in the same way as that in the first embodiment. The mass of the fiber reinforced plastic layers was 5,640 g.

Next, the intermediate vessel 20 was subjected to autofrettage treatment in the same way as that in the first embodiment so as to obtain the pressure vessel. The autofrettage treatment pressure was 140 MPa.

Evaluation was conducted in the same way as that in the first embodiment.

The burst pressure (BP) of the pressure vessel was 207 MPa. This value was equivalent to that of approximately 3 times as high as the normal filling pressure. The bursting state at that time in each case was an ideal bursting mode in which only a hole was opened at or in the vicinity of the center of the cylindrical section without splitting of the pressure vessel.

As a result of the fatigue properties testing, the number of cycles of the pressure fluctuation operations until bursting for the pressure vessel was 12,600. The burst position at that time was observed in the liner portion of the cylindrical section of the pressure vessel.

This pressure vessel was an example in which reinforcing fiber having a low elastic modulus and ideal elongation was used. Compared with the properties of pressure vessels of this class that were generally known, and even compared with the standards to which the safety factor was applied, adequate performance was exhibited in terms of burst properties and fatigue properties.

First Comparative Embodiment

A pressure vessel having a normal filling pressure (FP) of 70 MPa was prepared by the following procedure. In this comparative embodiment, reinforcing fibers were used which had ideal elongation; however, of which elastic modulus was somewhat low for a pressure vessel.

In the similar way as that in the first embodiment, fiber reinforced plastic layers having the fiber reinforced plastic 14 in which the reinforcing fibers (iii) (elongation: 1.5%, elastic modulus: 295 GPa) were impregnated with matrix plastic, were formed on the vessel body 2 so as to obtain the intermediate vessel 20.

The fiber reinforced plastic layers had the same 5-layer structure as that of the first embodiment. In the intermediate vessel 20, measurement result of the thickness of the fiber reinforced plastic layers at the center of the cylindrical section was approximately 13 mm.

The intermediate vessel 20 was subjected to heat treatment in the same way as that in the first embodiment. The mass of the fiber reinforced plastic layers was 5,648 g.

Next, the intermediate vessel 20 was subjected to autofrettage treatment in the same way as that in the first embodiment so as to obtain the pressure vessel. The autofrettage treatment pressure was 130 MPa.

The burst pressure (BP) of the pressure vessel was 179 MPa. This value was equivalent to that of 2.56 times as high as the filling pressure. The bursting state at that time in each case was an ideal bursting mode in which only a hole was opened at or in the vicinity of the center of the cylindrical section without splitting of the pressure vessel.

As a result of the fatigue properties testing, the number of cycles of the pressure fluctuation operations until bursting for the pressure vessel was 10,553. The burst position at that time was observed in the liner portion of the cylindrical section of the pressure vessel.

This pressure vessel was an example in which reinforcing fiber having a low elastic modulus and ideal elongation was used. Compared with the properties of pressure vessels of this class that were generally known, it was able to satisfy the standards; however, compared with the standards to which the safety factor was applied, it was undeniable that there was a slight deficiency in fatigue properties.

Second Comparative Embodiment

A pressure vessel having a normal filling pressure (FP) of 70 MPa was prepared by the following procedure.

In the similar way as that in the first embodiment, fiber reinforced plastic layers having the fiber reinforced plastic 14 in which the reinforcing fibers (iv) (elongation: 1.20%, elastic modulus: 390 GPa) were impregnated with matrix plastic, were formed on the vessel body 2 so as to obtain the intermediate vessel 20.

The fiber reinforced plastic layers had the same 5-layer structure as that of the first embodiment. In the intermediate vessel 20, measurement result of the thickness of the fiber reinforced plastic layers at the center of the cylindrical section was approximately 13 mm.

The intermediate vessel 20 was subjected to heat treatment in the same way as that in the first embodiment. The mass of the fiber reinforced plastic layers was 5,640 g.

Next, the intermediate vessel 20 was subjected to autofrettage treatment in the same way as that in the first embodiment so as to obtain the pressure vessel. The autofrettage treatment pressure was 125 MPa.

The burst pressure (BP) of the pressure vessel was 181 MPa. This value was equivalent to that of approximately 2.6 times as high as the filling pressure. With regard to the bursting state at that time, the burst portion was observed at the center of the cylindrical section. The bursting mode was such that, in the liner itself, only a hole was opened at or in the vicinity of the center of the cylindrical section; however, the fiber reinforced plastic layers on the outer side broke into two pieces or more.

As a result of the fatigue properties testing, the number of cycles of the pressure fluctuation operations until bursting for the pressure vessel was 19,821. The burst position at that time was observed in the liner portion of the cylindrical section of the pressure vessel.

This pressure vessel was an example in which reinforcing fibers having a high elastic modulus was used. Compared with the properties of general pressure vessels having this normal filling pressure, the standard values for vessel properties as well as the burst properties and fatigue properties required when considering safety may be said to have been satisfied. However, in contrast to the fact that fatigue properties were met more than necessary, the difference between autofrettage treatment pressure and burst pressure was small. Therefore, there was a possibility of bursting during autofrettage treatment due to variations in the strength of the reinforcing fibers. For this reason, the balancing of the strength and the elastic modulus of the reinforcing fiber was inadequate.

Third Comparative Embodiment

A pressure vessel having a normal filling pressure (FP) of 70 MPa was prepared by the following procedure.

In the similar way as that in the first embodiment, fiber reinforced plastic layers having the fiber reinforced plastic 14 in which the reinforcing fibers (v) (elongation: 2.0%, elastic modulus: 290 GPa) were impregnated with matrix plastic, were formed on the vessel body 2 so as to obtain the intermediate vessel 20.

The fiber reinforced plastic layers had the same 5-layer structure as that of the first embodiment. In the intermediate vessel 20, measurement result of the thickness of the fiber reinforced plastic layers at the center of the cylindrical section was approximately 13 mm.

The intermediate vessel 20 was subjected to heat treatment in the same way as that in the first embodiment. The mass of the fiber reinforced plastic layers was 5,652 g.

Next, the intermediate vessel 20 was subjected to autofrettage treatment in the same way as that in the first embodiment so as to obtain the pressure vessel. The autofrettage treatment pressure was 125 MPa.

The burst pressure (BP) of the pressure vessel was 228 MPa. This value was equivalent to that of approximately 3.3 times as high as the normal filling pressure. The bursting state at that time in each case was an ideal bursting mode in which only a hole was opened at or in the vicinity of the center of the cylindrical section without splitting of the pressure vessel.

As a result of the fatigue properties testing, the number of cycles of the pressure fluctuation operations until bursting for the pressure vessel was 9,815. The burst position at that time was observed in the liner portion of the cylindrical section of the pressure vessel.

This pressure vessel was an example in which reinforcing fiber having comparatively high strength was used. Compared with the properties of general pressure vessels having this normal filling pressure, the standard values for vessel properties were fully satisfied with regard to burst properties; however, fatigue properties were insufficient for the standard values. Accordingly, the balancing of the strength and the elastic modulus of the reinforcing fibers was inadequate.

Table 2 shows the results of the above embodiments and comparative embodiments.

reinforcing fibers had ideal elongation, it was necessary to increase the thickness of the fiber reinforced plastic layers in order to satisfy burst properties and fatigue properties.

On the other hand, there was the problem of weight increase (second and third comparative embodiments), because since the balancing of burst properties and fatigue properties is insufficient even though general burst properties or general fatigue properties were realized, it was necessary to increase the thickness of the fiber reinforced plastic layers in order to satisfy the one set of properties.

INDUSTRIAL APPLICABILITY

According to the present invention, it is possible to realize weight reduction for high-performance pressure vessels, and in particular, the pressure vessel of the present invention is suitable for the fuel tanks of various transport vehicles such as automobiles.

The invention claimed is:

1. A carbon fiber for a pressure vessel, of which a strand elastic modulus is 305 GPa or higher, and a tensile elongation is 1.45 to 1.70%, which comprises a plurality of filaments bearing creases on the surface thereof, and difference in height between the highest portion and the lowest portion of said creases is 40 nm or more, and 10% or less of the diameter of the filaments.

2. The carbon fiber for a pressure vessel according to claim 1, wherein said strand elastic modulus is 305 GPa to 420 GPa.

3. The carbon fiber for a pressure vessel according to claim 1, wherein the plurality of filaments has an average diameter of 6 μM or less.

TABLE 2

| | Reinforcing fibers | | | | | | Autofrettage | Burst properties | | | Fatigue properties | |
|---|---|---|---|---|---|---|---|---|---|---|---|---|
| | | Elastic | | | Pressure vessel | | treatment | Burst | | | Number | |
| | Type | modulus (GPa) | Elongation (%) | Matrix plastic | Thickness (mm) | Weight (g) | pressure (MPa) | pressure (MPa) | Burst mode | BP/FP | of fatigue cycles(N) | Burst position |
| Embodiment 1 | (i) | 350 | 1.50 | #700B | 13 | 5612 | 158 | 211 | 1 piece | 3.01 | 16190 | Cylindrical section |
| Embodiment 2 | (ii) | 320 | 1.64 | #700B | 13 | 5633 | 140 | 198 | 1 piece | 2.83 | 13308 | Cylindrical section |
| Embodiment 3 | (vi) | 360 | 1.45 | #700B | 13 | 5580 | 140 | 208 | 1 piece | 2.97 | 18310 | Cylindrical section |
| Embodiment 4 | (vii) | 320 | 1.64 | #700B | 13 | 5633 | 140 | 206 | 1 piece | 2.94 | 13500 | Cylindrical section |
| Embodiment 5 | (viii) | 310 | 1.70 | #700B | 13 | 5640 | 140 | 207 | 1 piece | 2.96 | 12600 | Cylindrical section |
| Comparative embodiment 1 | (iii) | 295 | 1.50 | #700B | 13 | 5648 | 130 | 179 | 1 piece | 2.56 | 10533 | Cylindrical section |
| Comparative embodiment 2 | (iv) | 390 | 1.20 | #700B | 13 | 5640 | 125 | 181 | Divided into 2 or more | 2.59 | 19821 | Cylindrical section |
| Comparative embodiment 3 | (v) | 290 | 2.00 | #700B | 13 | 5652 | 125 | 228 | 1 piece | 3.26 | 9815 | Cylindrical section |

The pressure vessels of the first and second embodiments had excellent balancing of burst properties and fatigue properties, and the potential for further weight reduction due to a high elastic modulus was confirmed.

In contrast, there was the problem of weight increase (first comparative embodiment), because since reinforcing fibers did not have a sufficient elastic modulus even though the

4. The carbon fiber for a pressure vessel according to claim 1, wherein the strand elastic modulus is 310 GPa or higher.

5. The carbon fiber for a pressure vessel according to claim 1, wherein the strand elastic modulus is 320 GPa or higher.

6. The carbon fiber for a pressure vessel according to claim 1, wherein the tensile elongation is 1.50 to 1.70%.

7. The carbon fiber for a pressure vessel according to claim 1, wherein the tensile elongation is 1.55 to 1.70%.

8. The carbon fiber for a pressure vessel according to claim 1, wherein the strand elastic modulus is no higher than 400 GPa.

9. The carbon fiber for a pressure vessel according to claim 1, wherein the strand elastic modulus is no higher than 380 GPa.

10. The carbon fiber for a pressure vessel according to claim 3, wherein the average diameter is 5.5 μm or less.

11. The carbon fiber for a pressure vessel according to claim 3, wherein the average diameter is 3 μm or more.

12. The carbon fiber for a pressure vessel according to claim 1, wherein 1,000 to 50,000 filaments having an average diameter of 5 to 8 μm are brought together to form said carbon fiber.

* * * * *